(12) United States Patent
Littlefield

(10) Patent No.: US 6,850,970 B2
(45) Date of Patent: Feb. 1, 2005

(54) APPROACH FOR CACHING ELECTRONIC PRODUCTS

(75) Inventor: Andrew Littlefield, San Mateo, CA (US)

(73) Assignee: Nktomi Corporation, Foster City, CA (US)

(*) Notice: Subject to any disclaimer, the term of this patent is extended or adjusted under 35 U.S.C. 154(b) by 846 days.

(21) Appl. No.: 09/827,282

(22) Filed: Apr. 4, 2001

(65) Prior Publication Data

US 2002/0147787 A1 Oct. 10, 2002

(51) Int. Cl.[7] .............................................. G06F 15/167
(52) U.S. Cl. ........................ 709/216; 709/203; 709/217; 709/246
(58) Field of Search ................................ 709/200–203, 709/213–219, 227–228, 246; 705/26–27

(56) References Cited

U.S. PATENT DOCUMENTS

| | | | |
|---|---|---|---|
| 5,611,049 A | 3/1997 | Pitts ....................... | 395/200.09 |
| 5,991,306 A | 11/1999 | Burns et al. ................. | 370/429 |
| 6,018,619 A | 1/2000 | Allard et al. ................ | 709/215 |
| 6,085,234 A | 7/2000 | Pitts et al. ................... | 709/217 |
| 6,151,634 A | 11/2000 | Glaser et al. ................ | 709/219 |
| 6,351,467 B1 * | 2/2002 | Dillon ......................... | 709/219 |
| 6,385,642 B1 * | 5/2002 | Chlan et al. ................. | 709/203 |
| 6,421,733 B1 * | 7/2002 | Tso et al. .................... | 709/246 |
| 6,622,168 B1 * | 9/2003 | Datta ........................... | 709/219 |
| 2002/0059107 A1 * | 5/2002 | Reich et al. .................. | 705/26 |
| 2002/0107934 A1 * | 8/2002 | Lowery et al. ............. | 709/203 |
| 2002/0107935 A1 * | 8/2002 | Lowery et al. ............. | 709/216 |

* cited by examiner

*Primary Examiner*—Bharat Barot
(74) *Attorney, Agent, or Firm*—Hickman Palermo Truong & Becker LLP; Edward A. Becker

(57) ABSTRACT

An approach for caching an electronic product generally involves the use of confirmation data that indicates that an electronic product was successfully provided from a cache to a user. A request to provide an electronic product to a user is received at a cache. In response to receiving the request to provide the electronic product to the user, the cache provides electronic product to the user. If the electronic product was successfully provided by the cache to the user, then the cache generates confirmation data that indicates that the electronic product was successfully provided by the cache to the user. The cache may also provide the confirmation data to a confirmation recipient. The confirmation data may also specify other information, such as an identity of the user, a location of the user and/or a time at which the cache provided the electronic product to the user.

42 Claims, 5 Drawing Sheets

APPROACH FOR CACHING ELECTRONIC PRODUCTS

FIELD OF THE INVENTION

The present invention relates generally to information management, and more specifically, to an approach for caching electronic products.

BACKGROUND OF THE INVENTION

The worldwide packet-based data communications network now commonly referred to as the "Internet" has experienced extraordinary growth and acceptance. The Internet provides access to many different types of information and data including electronic documents, music data files, e.g., MPEG Layer three (MP3) files, and video data files. With access to over several hundred million electronic documents, the Internet is arguably the largest single source of information in the world. As used herein, the term "electronic document" refers to any type of data or information in electronic form. Examples of electronic documents include, without limitation, text documents and web pages.

One of the great opportunities afforded by the Internet is the ability to purchase online a plethora of electronic products, such as music data files, video data files and computer software. Electronic products are sometimes provided to customers using an approach referred to generally as "caching." Caching generally refers to storing, at one or more locations other than a source location, copies of electronic products stored at the source location. Rather than processing every request for an electronic product by transmitting the product from the source location, requests may be processed by transmitting the electronic product from one of the other locations.

Caching has the benefit of reducing the workload of the source location and, in many cases, of providing the electronic product faster than it could be provided from the source location. For example, the location from which the electronic product is provided may be a location that is local to the customer, such as storage maintained by the Internet access provider used by the customer. Consider the following example in the context of the Internet.

FIG. 1 is a block diagram of a conventional arrangement 100 for providing Internet content, such as electronic products, to a user. A user 102 (customer) uses a tool, such as a Web browser executing on a computer, to connect to an access provider 104, for example an Internet Service Provider (ISP), via a communications link 106. An example of access provider 104 is the Internet dial-up service provided by America Online. Communications link 106 may be any medium that allows data to be exchanged between user 102 and access provider 104. Examples of communications link 106 include, without limitation, a dial up connection, a cable modem connection, a Digital Subscriber Line (DSL) connection and a wireless connection.

Access provider 104 is communicatively coupled to the Internet 108 via a communications link 110. Communications link 110 may be any medium that allows data to be exchanged between access provider 104 and Internet 108 and is often a broadband connection. Note that from the perspective of user 102, Access provider 104 and communications link 110 may be part of Internet 108, but are illustrated separately for purposes of explanation.

Content providers 112, 114, 116 are communicatively coupled to Internet 108 via communications links 118, 120, 122, respectively, and provide content to user 102. Typically, user 102 views web pages hosted by content providers 112, 114 and 116 and requests particular information and electronic products, such as music and videos, by selecting icons or links embedded in those web pages.

The requests go to access provider 104. In response to the requests, access provider 104 determines whether the electronic products are stored or "cached" at access provider 104. If the requested electronic products are not stored at access provider 104, access provider 104 requests the electronic products from content providers 112, 114, 116 over communications link 110, Internet 108 and communications links 118, 120, 122. Content providers 112, 114, 116 provide the requested electronic products to access provider 104 over communications links 118, 120, 122, Internet 108 and communications link 110. The electronic products are then stored or "cached" at access provider 104. Access provider 104 then provides the electronic products to user 102.

Thereafter, when any user connected to the Internet through access provider 104 requests the electronic products, the electronic products are provided to users 102 from the cache of access provider 104, rather than being retrieved from content providers 112, 114, 116.

Electronic products maintained locally, i.e., "cached", by access provider 104 are updated or refreshed from content providers 112, 114, 116 based upon a combination of subsequent user requests for the electronic products and a particular heuristic or algorithm used by the access provider to determine when to refresh the electronic products. For example, suppose that content provider 112 provides a particular electronic document. When user 102 first requests the particular electronic product, access provider 104 retrieves the particular electronic product from content provider 112, provides the particular electronic product to user 102, and stores the particular electronic product in a cache of access provider 104.

Some time later, another user (or user 102) requests from access provider 104 the same particular electronic product. In response to the request, access provider 104 applies a particular heuristic to determine whether the copy of the particular electronic product stored in the cache of access provider 104 should be provided to the other user, or whether a new copy of the particular electronic product should be retrieved from content provider 112 and provided to the other user. For example, access provider 104 may determine whether the cached copy of the particular electronic product is sufficiently new. If the cached copy of the particular electronic product is determined, based upon the heuristic, to be sufficiently new, then the copy of particular electronic product stored in the cache of access provider 104 is provided to the other user. If, however, based upon the heuristic, the cached copy of the particular electronic product is too old, then a new copy of the particular electronic product is retrieved from content provider 112.

One of the benefits afforded by the cache approach is that electronic products can generally be provided to user 102 from access provider 104 much faster than from content providers 112, 114, 116. Thus, the time required to provide electronic products to user 102 is not adversely affected by data transmission latencies in Internet 108 and communications links 110, 118, 120, 122 or the response time of content providers 112, 114, 116. The cache approach also reduces the amount of the load on content providers 112, 114, 116 since many requests are processed only by access provider 104 and not by content providers 112, 114, 116.

One problem with the caching approach is that content providers 112, 114, 116 do not know when particular content has been provided to user 102, since the content was not provided to the user directly from them. Thus, content providers do not necessarily know when orders for content have been successfully fulfilled. This information is important because it allows content providers to better manage their content.

Another problem with the caching approach is the inconvenience of the process from the customer perspective. Conventional approaches for purchasing electronic products over the Internet are often very cumbersome by requiring customers to separately pay for and then download the digital product. For example, to purchase an electronic product, such as a technical paper, customers are required to first complete a financial transaction and then separately download the software from the merchant. This approach can be very cumbersome and requires the customer to perform two separate activities. In addition, the processing of payment is not contingent upon a successful download. Thus, customers are sometimes charged for digital products that the customers were unable to completely download, for example because of a transmission error.

Based upon the increased use of caches to provide electronic products to customers and limitations in prior caching approaches, an approach for caching electronic products that does not suffer from limitations in prior approaches is highly desirable.

SUMMARY OF THE INVENTION

According to one aspect of the invention, a method is provided for processing a request for an electronic product. The method includes the computer-implemented steps of receiving at a cache a request to provide an electronic product to a user and in response to receiving the request to provide an electronic product to the user, the cache providing the electronic product to the user. The method further includes if the electronic product is successfully provided by the cache to the user, then the cache generating confirmation data that indicates that the electronic product was successfully provided from the cache to the user.

According to another aspect of the invention, a cache is provided that includes a storage medium and a confirmation mechanism. The confirmation mechanism is configured to in response to receiving a request to provide an electronic product to a user, provide the electronic product to the user, and if the electronic product is successfully provided by the cache to the user, then generate confirmation data that indicates that the electronic product was successfully provided from the cache to the user. In another aspect of the invention, the cache is further configured to provide the confirmation data to a confirmation recipient.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects of the invention are described in more detail hereinafter in the following sections: (1) functional overview; (2) processing orders for electronic products; (3) implementation mechanisms.

1. Functional Overview

An approach for caching electronic products generally involves the use of confirmation data that indicates that an electronic product was successfully provided from a cache to a user. A request to provide an electronic product to a user is received at a cache. In response to receiving the request to provide the electronic product to the user, the cache provides the electronic product to the user. If the cache successfully provides the electronic product to the user, then the cache generates confirmation data that indicates that the electronic product was successfully provided by the cache to the user. In contrast, conventional caches are generally passive mechanisms that are not configured to generate and provide data that indicates that the caches have successfully provided data to users. The confirmation data may be automatically provided by the cache to a confirmation recipient. Alternatively, the confirmation data may be provided by the cache to the confirmation recipient in response to a request by the confirmation recipient as to whether the request was completely processed.

In addition to reporting the successful delivery of an electronic product, the confirmation data may also specify other information, such as an identity of the user, a location of the user and/or a time at which the cache provided the electronic product to the user. The confirmation data may also refer to the specific request to provide the electronic product to the user, enabling a determination to be made that the specific request to provide the electronic product was successfully processed.

Figure 1:
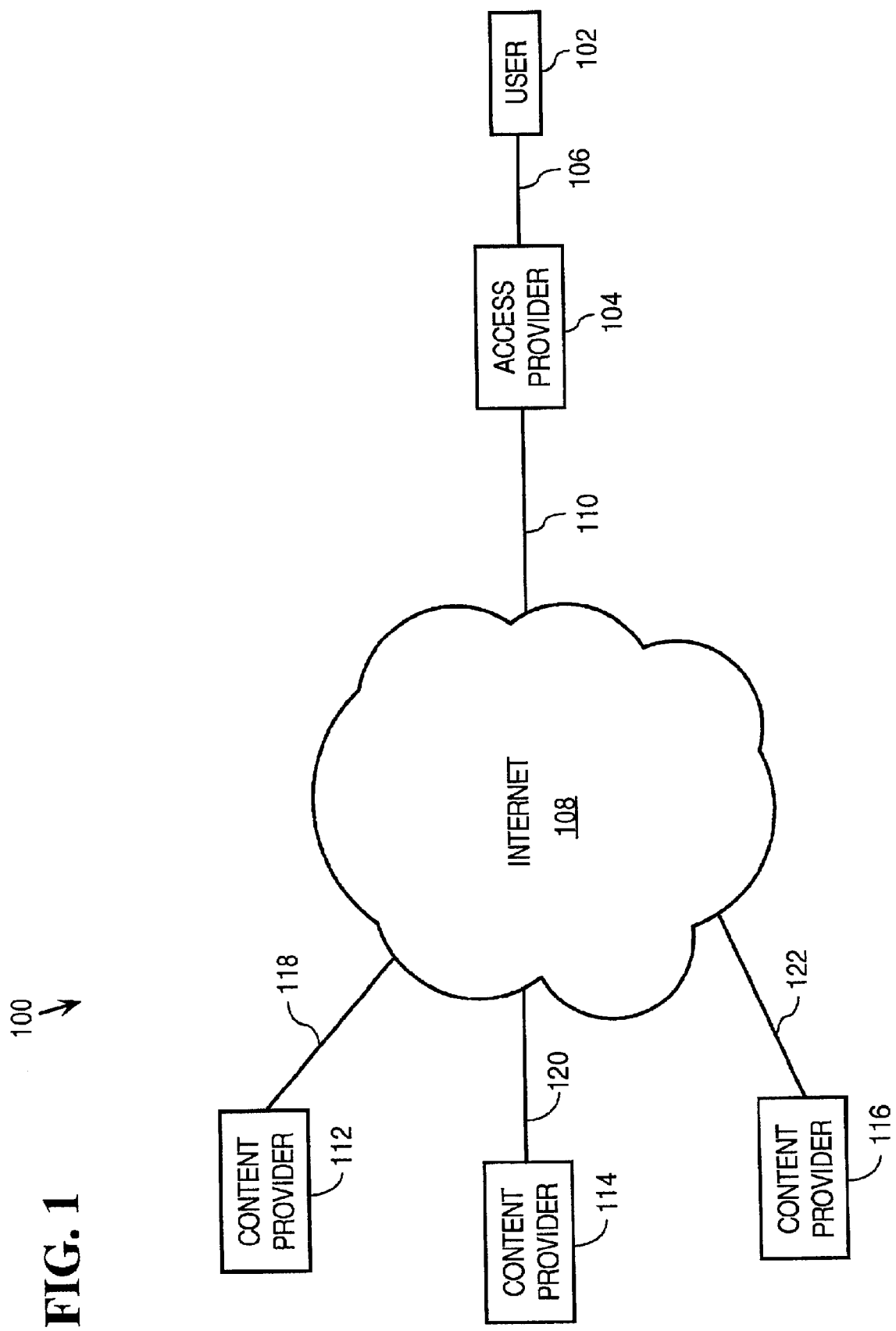
FIG. 1 is a block diagram of a conventional arrangement for providing Internet content, such as electronic products, to a user.
Figure 2:
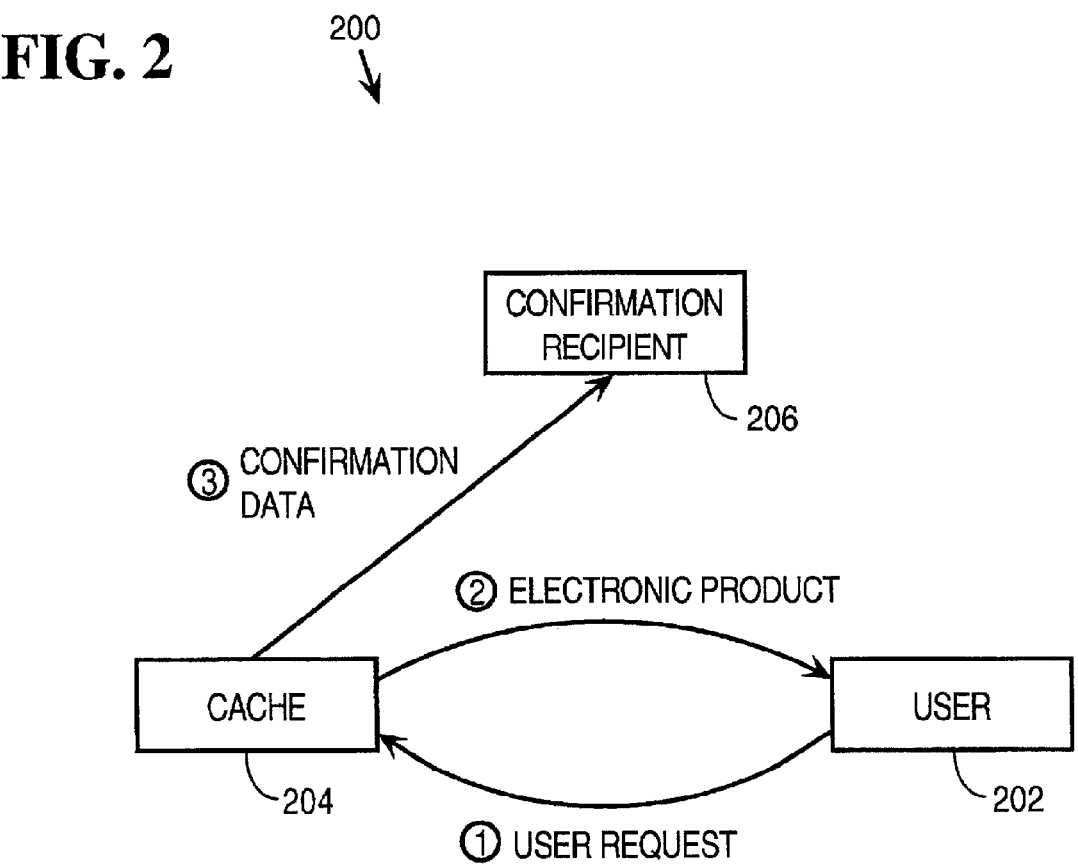
FIG. 2 is a block diagram of an arrangement for processing a request for an electronic product at a cache according to an embodiment of the invention.

FIG. 2 is a block diagram of an arrangement 200 for caching electronic products according to an embodiment of the invention. A user 202 submits to a cache 204 a request for an electronic product. Cache 204 processes the user request and provides the requested electronic product to user 202. The requested electronic product may already reside in cache 204, or cache 204 may obtain the requested electronic product from another location, for example, from an origin server.

According to one embodiment of the invention, cache 204 is configured to generate confirmation data that indicates that the electronic product was successfully provided by cache 204 to user 202. Cache 204 may be further configured to provide the confirmation data to a confirmation recipient 206. Upon receipt of the confirmation data, confirmation recipient 206 knows that the electronic product requested by user 202 was provided by cache 204. In situations where the confirmation data refers to the request to provide the electronic data to user 202, the confirmation data may be used to determine whether the specific request was successfully processed.

The use of confirmation data in this manner is useful in a variety of contexts. For example, the receipt of confirmation data may be used to determine that user 202 can be billed for the electronic product. According to one embodiment of the invention, the confirmation data may specify other information, such as an identity of the user, a location of the user and a time at which the cache provided the electronic product to the user. The additional types of information included in the confirmation data may vary depending upon the requirements of a particular application and the invention is not limited to any particular type of confirmation data.

2. Processing Orders for Electronic Products

Figure 3:
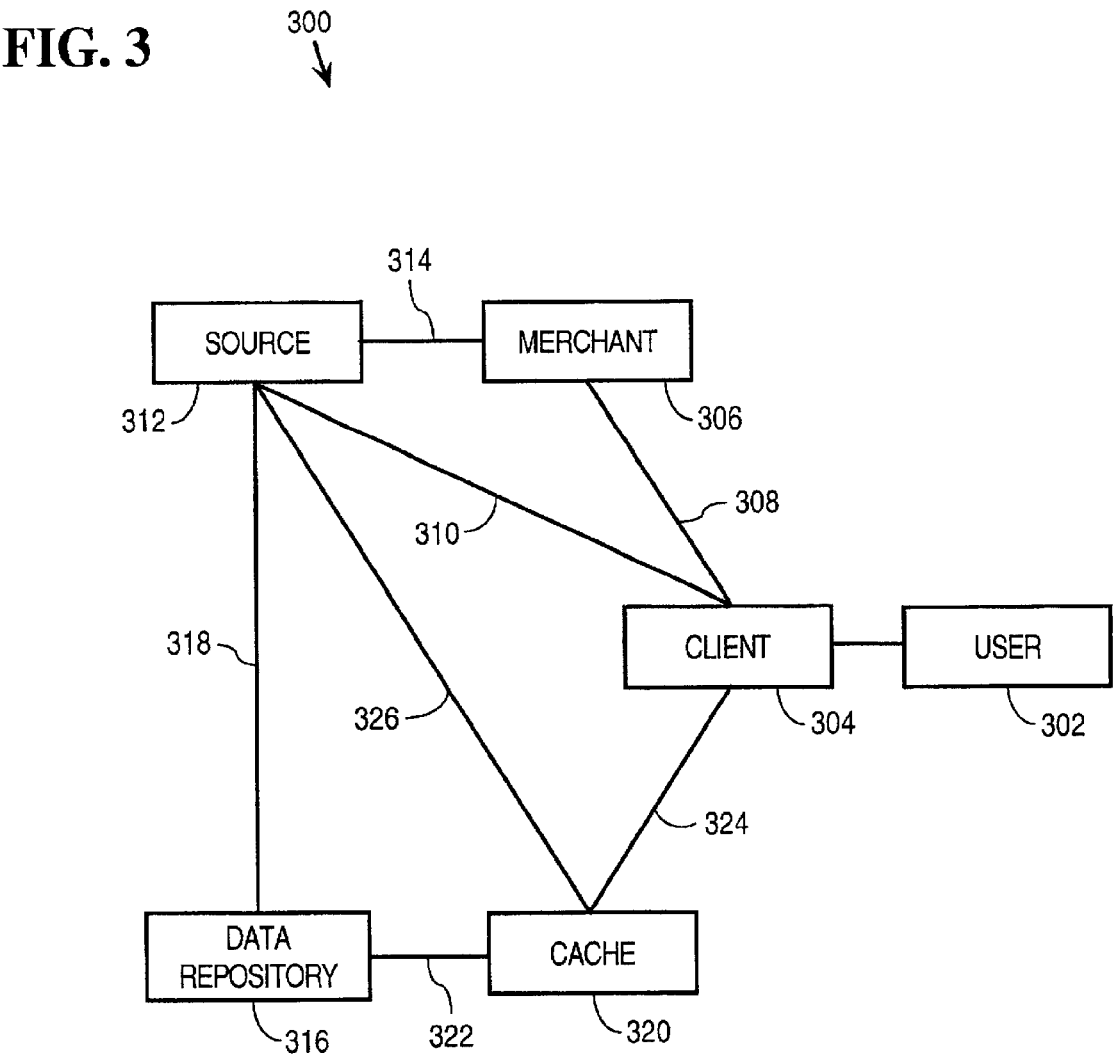
FIG. 3 is a block diagram of an arrangement for caching electronic products according to another embodiment of the invention.

FIG. 3 is a block diagram of an arrangement 300 for caching electronic products, according to another embodiment of the invention. Arrangement 300 includes a user 302 and a client 304 communicatively coupled to both a merchant 306 and a source 312 via communication links 308 and 310, respectively. Source 312 may be any source of data, such as a digital rights clearing house. Source 312 is communicatively coupled to merchant 306 via a communications link 314.

Arrangement 300 also includes a data repository 316 that is communicatively coupled to source 312 via a communications link 318, and a cache 320 that is communicatively coupled to data repository 316 via a communications link 322 and to client 304 via a communications link 324. Communications links 308, 310, 318, 322, 324, 326 may be implemented by any medium or mechanism that provides for the exchange of data between their respective endpoints and the invention is not limited to any particular type of communications links. Examples of communications links 308, 310, 318, 322, 324, 326 include, without limitation, one or more Local Area Networks (LANs), Wide Area Networks (WANs), Ethernets or the Internet, or one or more terrestrial, satellite or wireless links.

User 302 interacts with client 304 executing a generic Web browser to view Web pages containing information for various electronic products. For example, user 302 may use a search engine to identify Web pages containing links, e.g., Uniform Resource Locators (URLs), to a particular electronic product offered by merchant 306. In the present example, it is assumed that user 302 views one or more Web pages retrieved from merchant 306 that may include user interface objects, such as buttons, and links to that allow user 302 to purchase an electronic product offered by merchant 306. User 302 typically provides to merchant 306 all information required by merchant 306 to completely process the transaction, including, for example, fulfillment and billing information.

Once merchant 306 has received from user 302 all information required to completely process the transaction, merchant 306 instructs source 312 to provide the electronic product to user's 302 client 304. Source 312 may be any type of source for the electronic product purchased by user 302. Example implementations include, without limitation, a data warehouse and a digital rights clearing house, although the invention is not limited to any particular implementation of source. At this point, source 312 may optionally provide data, such as a password or decryption key, to client 304 over communications link 310 to enable client 304 to use the electronic product purchased by client 304.

Source 312 then instructs data repository 316 to provide the purchased electronic product to client 304. An example implementation of data repository 316 is an origin server. In this context, source 312 periodically provides or publishes data to data repository 316 and then instructs data repository 316 to provide the electronic products to particular clients for which a transaction has been properly authorized. Data repository 316 then instructs cache 320 to provide the electronic product to client 304. Cache 320 may be implemented by any type of storage mechanism and the invention is not limited to any particular type of cache. For example, cache 320 may be an array of caches configured in a hierarchical arrangement.

In the present example, the operation of providing the electronic product to client 304 may take several forms. In one situation, the electronic product purchased by user 302 may already reside in cache 320. This might occur if the same electronic product had previously been provided by cache 320 to another user. In this situation, data repository 316 instructs cache 320 to provide the electronic product 320 to client 320 over communications link 324.

In another situation, the electronic product purchased by user 302 does not reside in cache 320. In this situation, data repository 316 provides or "pushes" the electronic product to cache 320 over communications link 322 and instructs cache 320 to provide the electronic product to client 304 over communications link 324.

Once client 304 receives the electronic product, client 304 may perform processing required to allow user 302 to use the electronic product. For example, if the electronic product is encoded, e.g., encrypted, then client 304 decodes the electronic product using a decryption key or other data previously provided to client 304 by source 312. Note that although embodiments of the invention are described in the context of source 312 providing data, e.g., a decryption key or password, required by client 304 to use the electronic product, His information may be provided to client 304 by merchant 306.

According to one embodiment of the invention, cache 320 is configured to generate and provide confirmation data to a confirmation recipient. The confirmation data indicates that cache 320 successfully provided an electronic product to a client. In the present example, cache 320 generates and provides to source 312, over communications link 326, confirmation data that indicates that the electronic product has been provided to client 304. The confirmation data may take many forms and the invention is not limited to any particular form for the confirmation data. For example, the confirmation data may indicate particulars about the electronic product provided to client 304. The confirmation data may also specify information about client 304, such as an identity or location of client 304. The confirmation data may also specify information about user 302, such as the identity of user 302. According to another embodiment, the confirmation data specifies a time at which the electronic product was provided to client 304. Source 312 may provide the confirmation data received from cache 320 to merchant 306.

Unlike conventional caches that only provide usage statistics, the approach described herein allows source 312 and/or merchant 306 to know whether the electronic product ordered by client 304 was actually delivered to client 304. This information is particularly useful for merchant 306 to know in order to determine whether user 302 can be billed for an electronic product. Furthermore, using so-called "enhanced listings" Web pages, user 302 may complete a transaction for an electronic product using a "single click" and source 312 receives confirmation data indicating that the electronic product ordered by user 302 was actually provided by cache 320 to client 304. Enhanced listings are described in co-pending U.S. patent application Ser. No. 09/513,238, entitled "Delivering Non-Default Items in Association with Search Results" by Andrew Littlefield, Matthew Charles Grogan Hal, Michael E. Palmer and Troy Richardson Toman, filed on Feb. 24, 2000, the entire contents of which are incorporated herein by reference for all purposes.

Figure 4:
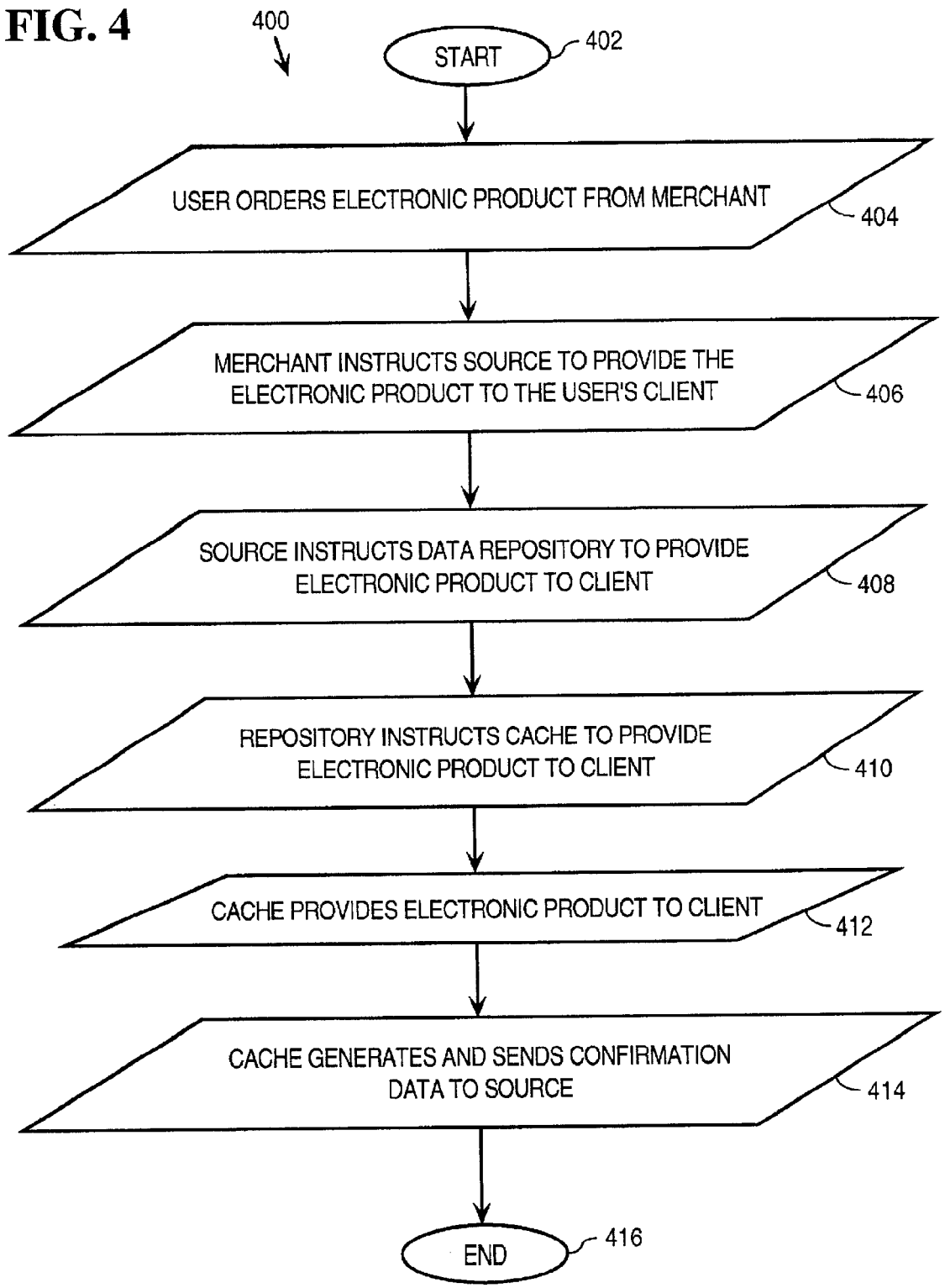
FIG. 4 is a flow diagram of an approach for caching electronic products according to another embodiment of the invention.

The approach for caching electronic products in the context of the Internet is now described with reference to arrangement 300 and a flow diagram 400 of FIG. 4. After starting in step 402, in step 404, user 302 uses client 304 to order an electronic product from merchant 306. As previously described, this may involve user 302 selecting various links on Web pages and providing to merchant 306 information required by merchant 306 to completely process the transaction, such as fulfillment information.

In step 406, merchant 306 instructs source 312 to provide to client 304 the electronic product ordered by user 302. At this point, source 312 may provide to client 304 information, such as a decryption key or password, that will be used by client 304 to decode the electronic product provided by cache 320 to client 304.

In step 408, source 312 instructs data repository 316 to provide to client 304 the electronic product ordered by user 302. If the electronic product is not present in cache 320, then data repository 316 "pushes" the electronic product to cache 320. Alternatively, the electronic product may already reside in cache 320.

In step 410, data repository 316 instructs cache 320 to provide to client 304 the electronic product ordered by user 302. In step 412, cache 320 provides the electronic product to client 304. In step 414, cache 320 generates and provides to source 312 confirmation data that indicates that the electronic product was successfully provided to client 304. The process is complete in step 416.

3. Implementation Mechanisms

The approach for caching electronic products may be implemented in a wide variety of applications and contexts. For example, the approach may be implemented by a process or mechanism integrated into a cache or cache hierarchy or network. Alternatively, the approach may be implemented as a stand alone process or mechanism that interacts with a cache or cache hierarchy or cache network. As another example, the approach may be implemented as a process executing in conjunction with a network cache manager. Thus, the approach may be implemented in hardware circuitry, in computer software, or a combination of hardware circuitry and computer software and the invention is not limited to a particular hardware or software implementation.

Figure 5:
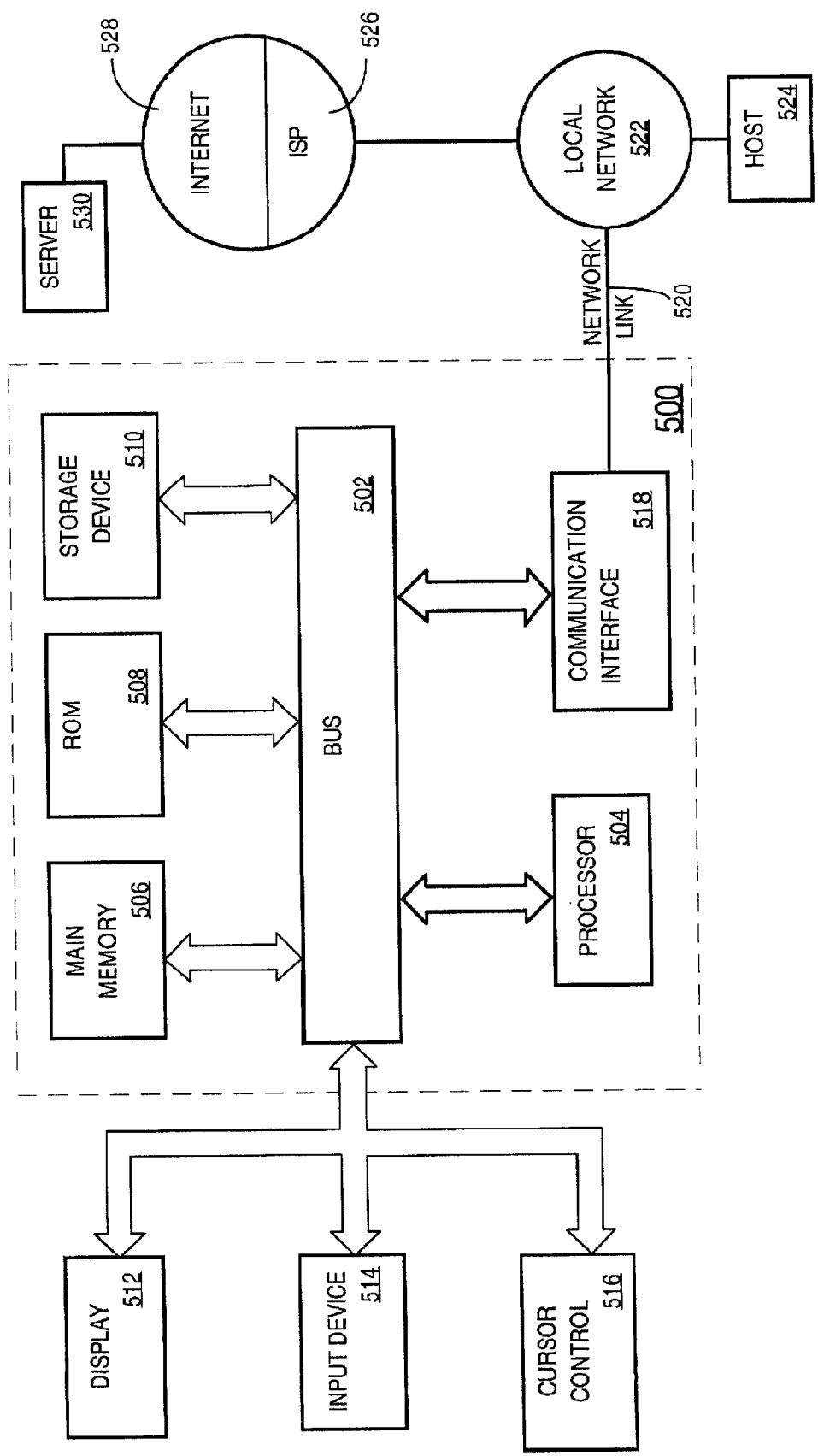
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for caching electronic products. According to one embodiment of the invention, the caching of electronic products is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multiprocessing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing 110 various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for the caching of electronic products as described herein.

The received code may be executed by processor 504 as it is received, and/or stored in storage device 510, or other non-volatile storage for later execution. In this manner, computer system 500 may obtain application code in the form of a carrier wave.

The novel approach described herein for caching an electronic product provides several advantages over prior approaches. First, the approach provides the benefits of conventional caches by reducing the amount of time and resources required to provide electronic products to users and reducing the loading on content providers. Second, in addition to providing cache usage data, the approach involves the use of confirmation data, generated and provided by a cache to a confirmation recipient. The confirmation data indicates that an electronic product was provided by the cache to a user. Thus, the confirmation data may be used by a merchant or other entity to verify whether an electronic product was actually provided to a user, so that the user can be billed for the electronic product.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A method for processing a request for an electronic product comprising the computer-implemented steps of:
   receiving at a cache a request to provide an electronic product to a user;
   in response to receiving the request to provide an electronic product to the user, the cache providing the electronic product to the user;
   if the electronic product is successfully provided by the cache to the user, then the cache generating confirmation data that indicates that the electronic product was successfully provided from the cache to the user.

2. The method as recited in claim 1, further comprising the cache providing the confirmation data to a confirmation recipient.

3. The method as recited in claim 1, further comprising the cache providing the confirmation data to a confirmation recipient in response to an inquiry by the confirmation recipient about whether the electronic product was successfully provided by the cache to the user.

4. The method as recited in claim 1, wherein the confirmation data indicates an identity of the user.

5. The method as recited in claim 1, wherein the confirmation data indicates a location of the user.

6. The method as recited in claim 1, wherein the confirmation data indicates a time at which the electronic product was provided from the cache to the user.

7. The method as recited in claim 1, wherein the electronic product includes music data.

8. The method as recited in claim 1, wherein the electronic product includes image data.

9. The method as recited in claim 1, wherein the electronic product includes video data.

10. The method as recited in claim 1, wherein the request to provide an electronic product to a user is received at the cache from an origin server.

11. The method as recited in claim 1, wherein the confirmation recipient is a digital rights clearinghouse.

12. The method as recited in claim 1, wherein the confirmation recipient is a merchant of the electronic product.

13. The method as recited in claim 12, wherein receipt of the confirmation data by the merchant triggers a billing event for the electronic product.

14. The method as recited in claim 1, further comprising providing access data to the user to allow the user to use the electronic product.

15. The method as recited in claim 14, wherein the access data and the request to provide an electronic product to the user originate from the same entity.

16. A computer-readable medium carrying one or more sequences of one or more instructions for processing a request for an electronic product, the one or more sequences of one or more instructions including instructions which, when executed by one or more processors, cause the one or more processors to perform the steps of:
   receiving at a cache a request to provide an electronic product to a user;
   in response to receiving the request to provide an electronic product to the user, the cache providing the electronic product to the user;
   if the electronic product is successfully provided by the cache to the user, then the cache generating confirmation data that indicates that the electronic product was successfully provided from the cache to the user.

17. The computer-readable medium as recited in claim 16, further comprising one or more sequences of additional instructions which, when executed by the one or more processors, cause the cache to provide the confirmation data to a confirmation recipient.

18. The computer-readable medium as recited in claim 16, further comprising one or more sequences of additional instructions which, when executed by the one or more processors, cause the cache to provide the confirmation data to a confirmation recipient in response to an inquiry by the confirmation recipient about whether the electronic product was successfully provided by the cache to the user.

19. The computer-readable medium as recited in claim 16, wherein the confirmation data indicates an identity of the user.

20. The computer-readable medium as recited in claim 16, wherein the confirmation data indicates a location of the user.

21. The computer-readable medium as recited in claim 16, wherein the confirmation data indicates a time at which the electronic product was provided from the cache to the user.

22. The computer-readable medium as recited in claim 16, wherein the electronic product includes music data.

23. The computer-readable medium as recited in claim 16, wherein the electronic product includes image data.

24. The computer-readable medium as recited in claim 16, wherein the electronic product includes video data.

25. The computer-readable medium as recited in claim 16, wherein the request to provide an electronic product to a user is received at the cache from an origin server.

26. The computer-readable medium as recited in claim 16, wherein the confirmation recipient is a digital rights clearinghouse.

27. The computer-readable medium as recited in claim 16, wherein the confirmation recipient is a merchant of the electronic product.

28. The computer-readable medium as recited in claim 27, wherein receipt of the confirmation data by the merchant triggers a billing event for the electronic product.

29. The computer-readable medium as recited in claim 16, further comprising one or more sequences of additional instructions which, when executed by the one or more processors, cause access data to be provided to the user to allow the user to use the electronic product.

30. The computer-readable medium as recited in claim 29, wherein the access data and the request to provide an electronic product to the user originate from the same entity.

31. A cache comprising:
   a storage medium; and
   a confirmation mechanism configured to:
      in response to receiving a request to provide an electronic product to a user, provide the electronic product to the user, and
      if the electronic product is successfully provided by the cache to the user, then generate confirmation data that indicates that the electronic product was successfully provided from the cache to the user.

32. The cache as recited in claim 31, wherein the cache is further configured to provide the confirmation data to a confirmation recipient.

33. The cache as recited in claim 31, wherein the cache is further configured to provide the confirmation data to a confirmation recipient in response to an inquiry by the confirmation recipient about whether the electronic product was successfully provided by the cache to the user.

34. The cache as recited in claim 31, wherein the confirmation data indicates an identity of the user.

35. The cache as recited in claim 31, wherein the confirmation data indicates a location of the user.

36. The cache as recited in claim 31, wherein the confirmation data indicates a time at which the electronic product was provided from the cache to the user.

37. The cache as recited in claim 31, wherein the electronic product includes music data.

38. The cache as recited in claim 31, wherein the electronic product includes image data.

39. The cache as recited in claim 31, wherein the electronic product includes video data.

40. The cache as recited in claim 31, wherein the request to provide an electronic product to a user is received at the cache from an origin server.

41. The cache as recited in claim 31, wherein the confirmation recipient is a digital rights clearinghouse.

42. The cache as recited in claim 31, wherein the confirmation recipient is a merchant of the electronic product.

* * * * *

UNITED STATES PATENT AND TRADEMARK OFFICE
CERTIFICATE OF CORRECTION

PATENT NO. : 6,850,970 B2
DATED : February 1, 2005
INVENTOR(S) : Andrew Littlefield It is certified that error appears in the above-identified patent and that said Letters Patent is hereby corrected as shown below:

Title page,
Item [73], Assignee, replace "Nktomi Corporation, Foster City, CA," with -- Inktomi Corporation, Foster City, CA --.

Signed and Sealed this

Thirty-first Day of May, 2005

JON W. DUDAS
*Director of the United States Patent and Trademark Office*